(12) United States Patent
Smith et al.

(10) Patent No.: US 8,891,532 B1
(45) Date of Patent: Nov. 18, 2014

(54) SYSTEM AND METHOD FOR CONVEYING THE REASON FOR TCP RESET IN MACHINE-READABLE FORM

(75) Inventors: Jonathan M. Smith, Bracknell (GB);
Chin Fung Lai, Bracknell (GB);
Antonio R. Carlini, Abingdon (GB);
Andrew S. Chittenden, Reading (GB)

(73) Assignee: Hitachi Data Systems Engineering UK Limited, Bracknell, Berkshire (GB)

( * ) Notice: Subject to any disclaimer, the term of this patent is extended or adjusted under 35 U.S.C. 154(b) by 68 days.

(21) Appl. No.: 13/109,520

(22) Filed: May 17, 2011

(51) Int. Cl.
*H04L 12/28* (2006.01)
*H04L 29/06* (2006.01)

(52) U.S. Cl.
CPC .................................. *H04L 69/161* (2013.01)
USPC .................................................... 370/395.52

(58) Field of Classification Search
USPC .......... 709/230, 223–224, 227–229; 370/231, 370/325, 401, 212, 428, 389, 412
See application file for complete search history.

(56) References Cited

U.S. PATENT DOCUMENTS

| | | | |
|---|---|---|---|
| 6,987,768 B1* | 1/2006 | Kojima et al. | 370/401 |
| 8,145,746 B1* | 3/2012 | Singh et al. | 709/224 |
| 8,572,245 B1* | 10/2013 | Singh et al. | 709/224 |
| 2002/0131400 A1* | 9/2002 | Tinsley et al. | 370/352 |
| 2006/0075482 A1* | 4/2006 | Appanna et al. | 726/14 |
| 2006/0133554 A1* | 6/2006 | Horn | 375/354 |
| 2007/0300290 A1* | 12/2007 | Shay et al. | 726/3 |
| 2008/0059596 A1* | 3/2008 | Ogawa | 709/207 |
| 2008/0170501 A1* | 7/2008 | Patel et al. | 370/235 |
| 2009/0067325 A1* | 3/2009 | Baratakke et al. | 370/229 |
| 2009/0083611 A1* | 3/2009 | Basso et al. | 714/807 |
| 2010/0024026 A1* | 1/2010 | Ylonen et al. | 726/12 |
| 2010/0174824 A1* | 7/2010 | Aloni et al. | 709/230 |
| 2010/0211626 A1* | 8/2010 | Li | 709/203 |
| 2010/0214919 A1* | 8/2010 | Kosbab et al. | 370/231 |
| 2010/0281168 A1* | 11/2010 | Li et al. | 709/227 |
| 2011/0093591 A1* | 4/2011 | Dalal et al. | 709/224 |
| 2011/0119550 A1* | 5/2011 | Fantaske | 714/748 |
| 2011/0249564 A1* | 10/2011 | Cho | 370/241 |
| 2013/0156023 A1* | 6/2013 | Horn | 370/350 |

\* cited by examiner

*Primary Examiner* — Anh-Vu Ly
*Assistant Examiner* — Gustavo Lopez-Vargas
(74) *Attorney, Agent, or Firm* — Sunstein Kann Murphy & Timbers LLP (57) ABSTRACT

An RST reason code is conveyed in a predetermined field of the TCP or IP header for a TCP RST packet in order to indicate the reason for the RST. In this way, an enhanced TCP device that receives the RST packet can access the RST reason code in machine-readable form and, unlike prior art implementations in which ASCII text is carried in the TCP payload to provide a RST reason, without having to process the payload of the TCP packet.

31 Claims, 8 Drawing Sheets

SYSTEM AND METHOD FOR CONVEYING THE REASON FOR TCP RESET IN MACHINE-READABLE FORM

FIELD OF THE INVENTION

The present invention relates generally to conveying the reason for resetting a communication connection, and, in particular, a TCP connection, in machine-readable form.

BACKGROUND OF THE INVENTION

In today's information age, computers and other types of communication devices are often interconnected over communication networks. Examples of communications networks include private and public local area networks, metropolitan area networks, wide area networks, and intranets. Perhaps the most well-known and widely used communication network is the Internet.

Figure 1:
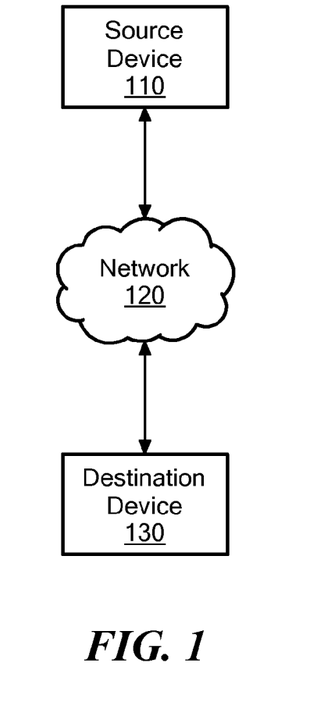
FIG. 1 schematically shows a representation of a communication system as known in the art.

FIG. 1 schematically shows a representation of a communication system as known in the art. Here, a source communication device 110 is in communication with a destination communication device 130 over a communication network such as the Internet 120. The Internet is based on a suite of protocols known as TCP/IP, which is promulgated by the Internet Engineering Task Force ("IETF"). The protocols in the TCP/IP suite are generally defined in terms of a hierarchy (stack) having various protocol layers, where each layer uses communication services provided by the protocol layer immediately below it in the stack and provides communication services to the protocol layer immediately above it in the stack.

The Internet Protocol ("IP"), part of the TCP/IP suite of protocols, is a network layer protocol used in the Internet and in other networks. IP messages (often referred to as "datagrams") are routed through the network based on source and destination IP addresses. Because there is no concept of an end-to-end connection at the IP layer, and because IP does not include mechanisms for ensuring delivery of IP datagrams to the destination, IP datagrams may be dropped by the communication network or routed over different paths so as to arrive at the destination out-of-order. Thus, IP is considered to be a connectionless, unreliable protocol.

Today, there are two commonly-used versions of IP, namely IP version 4 ("IPv4") and IP version 6 ("IPv6"). IPv4 is described in IETF RFC 791, which is hereby incorporated herein by reference in its entirety. IPv6 is described in IETF RFC 2460, which is hereby incorporated herein by reference in its entirety. The main purpose of both versions is to provide unique global computer addressing to ensure that communicating devices can identify one another. One of the main distinctions between IPv4 and IPv6 is that IPv4 uses 32-bit addresses, whereas IPv6 utilizes 128 bit addresses. In addition, IPv6 can support larger datagram sizes.

IPv4 datagrams have the following general header format:

```
+-+-+-+-+-+-+-+-+-+-+-+-+-+-+-+-+-+-+-+-+-+-+-+-+-+-+-+-+-+-+-+-+
|Version|  IHL  |Type of Service|          Total Length         |
+-+-+-+-+-+-+-+-+-+-+-+-+-+-+-+-+-+-+-+-+-+-+-+-+-+-+-+-+-+-+-+-+
|         Identification        |Flags|      Fragment Offset    |
+-+-+-+-+-+-+-+-+-+-+-+-+-+-+-+-+-+-+-+-+-+-+-+-+-+-+-+-+-+-+-+-+
|  Time to Live |    Protocol   |         Header Checksum       |
+-+-+-+-+-+-+-+-+-+-+-+-+-+-+-+-+-+-+-+-+-+-+-+-+-+-+-+-+-+-+-+-+
|                         Source Address                        |
+-+-+-+-+-+-+-+-+-+-+-+-+-+-+-+-+-+-+-+-+-+-+-+-+-+-+-+-+-+-+-+-+
|                       Destination Address                     |
+-+-+-+-+-+-+-+-+-+-+-+-+-+-+-+-+-+-+-+-+-+-+-+-+-+-+-+-+-+-+-+-+
|                    Options                    |    Padding    |
+-+-+-+-+-+-+-+-+-+-+-+-+-+-+-+-+-+-+-+-+-+-+-+-+-+-+-+-+-+-+-+-+
```

IPv6 datagrams have the following general header format:

```
+-+-+-+-+-+-+-+-+-+-+-+-+-+-+-+-+-+-+-+-+-+-+-+-+-+-+-+-+-+-+-+-+
|Version| Traffic Class |              Flow Label               |
+-+-+-+-+-+-+-+-+-+-+-+-+-+-+-+-+-+-+-+-+-+-+-+-+-+-+-+-+-+-+-+-+
|         Payload Length        |  Next Header  |   Hop Limit   |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                         Source Address                        +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                      Destination Address                      +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

IP datagrams are often used to encapsulate and carry messages from higher layer protocols. In the TCP/IP suite of protocols, the layer above the IP layer is referred to as the transport layer. One commonly-used transport layer protocol is the Transmission Control Protocol ("TCP"). TCP is described in IETF RFC 793, which is hereby incorporated herein by reference in its entirety. Transport layer messages (often referred to as "segments") are essentially used to carry information from a particular application in the source to the corresponding application in the destination, whereas the IP datagram itself is essentially used as an envelope to carry the TCP segment from the source to the destination. TCP segments can be carried over other protocols and therefore TCP is not limited to use with IP.

TCP segments have the following general format:

The following is a representation of the format of the TCP header:

| + | Bits 0-3 | 4-9 | 10-15 | 16-31 |
|---|---|---|---|---|
| 0 | Source Port | | | Destination Port |
| 32 | Sequence Number | | | |
| 64 | Acknowledge Number | | | |
| 96 | Data Offset | Reserved | Control Bits | Window |
| 128 | Checksum | | | Urgent Pointer |
| 160 | Options | | | |

As shown above, the TCP header includes a 16-bit source port field, a 16-bit destination port field, a 32-bit sequence number field, a 32-bit acknowledgement number field, a 4-bit data offset field, a 6-bit reserved field, a 6-bit control bits field, a 16-bit window field, a 16-bit checksum field, a 16-bit urgent pointer field, and an optional variable-length options field that is padded with zeros as necessary to make the options field an integer multiple of 32-bits.

IETF RFC 4413, which is hereby incorporated herein by reference in its entirety, describes TCP/IP field behavior.

As is generally known, TCP segments can be carried by protocols other than IP, e.g., TCP segments can be carried directly in Ethernet packets. Similarly, IP can be used to carry other higher layer protocols, e.g., User Datagram Protocol (UDP) and Internet Control Message Protocol (ICMP) messages.

TCP is considered to be a connection-oriented protocol in that an end-to-end connection is established between two TCP devices, specifically using a so-called "three-way handshake." The device at one end of a TCP connection may tear down a connection for any number of reasons by sending a TCP reset (RST) packet, and RST packets can be sent for other reasons (e.g., even when there is no TCP connection established). In some TCP implementations, ASCII text may be included in the payload of a RST packet to indicate a reason for the reset. Generally speaking, such ASCII text is intended for use by humans and is really only useful if the ASCII text has been dumped or displayed.

SUMMARY OF THE INVENTION

In embodiments of the present invention, an enhanced communication device inserts a RST reason code into a predetermined header field of the RST message in order to indicate the reason for the RST. For example, an enhanced TCP device may insert a RST reason code into a predetermined field of the TCP header, or if TCP is running over IP, into a predetermined field of the IP header, in order to indicate the reason for the TCP RST. In this way, an enhanced TCP device that receives the RST packet can access the RST reason code in machine-readable form and, unlike prior art implementations in which ASCII text is carried in the TCP payload to convey a RST reason, without having to process the payload of the TCP packet.

In accordance with one aspect of the invention there is provided a method for conveying the reason for TCP reset in machine-readable form. The method involves, by a transmitting device, formatting a message including a TCP RST segment and a RST reason code in a header field of the message and transmitting the message over a communication network; and by a receiving device, receiving the message from the communication network, retrieving the RST reason code from the header field of the message, and processing the TCP RST segment based on the RST reason code.

In accordance with another aspect of the invention there is provided a method for conveying the reason for TCP reset in machine-readable form. The method involves formatting, by a transmitting device, a message including a TCP RST segment and a RST reason code in a header field of the message; and transmitting the message by the transmitting device over a communication network.

In accordance with another aspect of the invention there is provided apparatus for conveying the reason for TCP reset in machine-readable form. The apparatus includes a transmitter configured to format a message including a TCP RST segment and a RST reason code in a header field of the message; and a network interface in communication with the transmitter and configured to transmit the message over a communication network.

In accordance with another aspect of the invention there is provided a method for processing TCP RST packets that involves receiving, by a receiving device over a communication network, a message including a TCP RST segment and a RST reason code in a header field of the message; retrieving the RST reason code from the header field of the message; and processing the TCP RST segment based on the RST reason code.

In accordance with another aspect of the invention there is provided apparatus for processing TCP RST packets including a network interface configured to receive a message over a communication network; and a receiver configured to process the message, and when the message includes a TCP RST segment and a RST reason code in a header field of the message, to retrieve the RST reason code from the header field of the message and process the TCP RST segment based on the RST reason code.

In various alternative embodiments, the header field may be a field of the TCP header, such as the Urgent Pointer field. Alternatively, the header field may be a field of the IP header, such as the Identification field for an IPv4 datagram of the Flow Label field for an IPv6 datagram. The RST reason codes may be encoded in any of a variety of way, and additional information may be conveyed along with the RST reason code in the header field. Particularly with regard to use of the Flow Label field of an IPv6 datagram, the Flow Label field may be subdivided into a RST reason code sub-field and a flow sub-field so that values carried in the Flow Label field can be made to emulate flows for devices that pay attention to the Flow Label field.

In various alternative embodiments, the transmitter and/or receiver may include dedicated hardware that operates outside the immediate control of a software program. The transmitter may included dedicated hardware configured to at least insert the RST reason code into the header field of the message. The receiver may include dedicated hardware configured to at least retrieve the RST reason code from the header field of the message and process the TCP RST segment based on the RST reason code. For embodiments in which the message includes an IP header and a TCP header, the dedicated hardware of the receiver may include an IP header processor configured to process the IP header including at least determining that the message includes a TCP segment and a TCP header processor configured to process the TCP header including at least determining that the TCP segment is a TCP RST segment, where the IP header processor and/or the TCP header processor is configured to retrieve the RST reason code from the header field of the message.

In embodiments where the RST reason code is carried in the TCP header, RST reasons can be conveyed regardless of the protocol that is used to encapsulate TCP segments, and thus the RST reason can be conveyed whether TCP is carried over IP, directly in Ethernet frames, or in other protocols.

In embodiments where the RST reason code is carried in the IP layer, RST reasons can be conveyed for other higher-layer protocols that run over IP.

BRIEF DESCRIPTION OF THE DRAWINGS

The foregoing and advantages of the invention will be appreciated more fully from the following further description thereof with reference to the accompanying drawings wherein.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

As discussed above, a communication device such as a communication device running the TCP protocol (referred to hereinafter as a "TCP device") may send a reset (RST) message (packet) for any of a number of reasons. Without limitation, the following are some of the reasons a TCP device may send a TCP RST:

The TCP device receives a TCP segment not containing a RST for a connection that was not open, which is not acceptable according to RFC 793;

The TCP device transmits a SYN and receives a TCP segment that does not acknowledge the SYN, which is not acceptable according to RFC 793;

The TCP device receives a SYN in the window, which is not acceptable according to RFC 793;

The TCP device retransmitted a SYN or SYN/ACK too many times without being acknowledged;

The TCP device retransmitted a data segment too many times;

A zero window was advertised for too long;

The TCP device sent too many keep-alive messages without being acknowledged;

The application layer of the TCP device requested that a RST packet be sent; and An Upper Layer Protocol (ULP) error was encountered (for example, a malformed iSCSI header was received).

In embodiments of the present invention, an enhanced communication device inserts a RST reason code into a predetermined header field of the RST message in order to indicate the reason for the RST. For example, an enhanced TCP device may insert a RST reason code into a predetermined field of the TCP header, or if TCP is running over IP, into a predetermined field of the IP header, in order to indicate the reason for the TCP RST. In this way, an enhanced TCP device that receives the RST packet can access the RST reason code in machine-readable form and, unlike prior art implementations in which ASCII text is carried in the TCP payload to convey a RST reason, without having to process the payload of the TCP packet. Among other things, conveying an RST reason code in the TCP or IP header allows the receiving device to determine why the sending device had sent the RST, without needing to monitor the sending end at the same time, without taking a packet capture, and without knowing beforehand which connection would be torn down.

It should be noted that, preferably, the RST reason code is carried in a header field that is neither changed nor acted upon by the communication network over which the TCP packets are carried. Thus, for example, routers that carry the TCP/IP traffic should not change the field in which the RST reason code is carried.

It also should be noted that, preferably, the RST reason code is carried in such a way that enhanced TCP devices could interoperate with standard TCP devices. Specifically, the RST reason code is preferably encoded in such a way that a standard TCP device that receives a RST packet from an enhanced TCP device will ignore or otherwise be unaffected by the RST reason code and also in such a way that an enhanced TCP device that receives a RST packet from a regular TCP device will recognize that no valid RST reason code is included. In certain embodiments, however, enhanced TCP devices will be expected to communicate only with other enhanced TCP devices (e.g., devices from the same manufacturer or of the same type communicating in a peer-to-peer fashion), in which case support for such interoperability may be unnecessary, give more flexibility in selecting the RST reason codes and the fields used for carrying the RST reason codes.

Typically, the RST reason code is a numeric (encoded) value that can be used by the receiving device to perform a simple look-up to determine the reason for the RST packet. Without limitation, the following table shows exemplary 16-bit RST reason codes for the RST reasons listed above:

| Code | Mnemonic | Explanation |
| --- | --- | --- |
| 0xffe1 | RECEIVED_SEG_IN_CLOSED_STATE | A segment not containing a RST was received for a connection that was not open. This is not acceptable according to RFC 793, so a RST was sent. |

-continued

| Code | Mnemonic | Explanation |
|---|---|---|
| 0xffe2 | RECEIVED_BAD_ACK_FOR_SYN | A segment that does not acknowledge our SYN was received. This is not acceptable according to RFC 793, so a RST was sent. |
| 0xffe3 | RECEIVED_SYN_IN_WND | A SYN was received in the window, which is not acceptable according to RFC 793, so a RST was sent. |
| 0xffe4 | RETRANSMITTED_SYN_TOO_MANY_TIMES | A SYN or SYN/ACK was re-transmitted too many times without being acknowledged, so a RST was sent. |
| 0xffe5 | RETRANSMITTED_DATA_TOO_MANY_TIMES | A data segment was re-transmitted too many times, so a RST was sent. |
| 0xffe6 | TRANSMITTED_TOO_MANY_ZERO_WINDOW_PROBES | The client advertised a zero window for too long, so a RST was sent. |
| 0xffe7 | KEEP_ALIVE_NOT_RECEIVED | Too many keep-alives were sent without being acknowledged, so a RST was sent. |
| 0xffe8 | CONNECTION_RESET_BY_APPLICATION | The application layer has asked for a RST to be sent. |
| 0xffe9 | CONNECTION_RESET_DUE_TO_ULP_ERROR | An Upper Layer Protocol (ULP) error was encountered (for example, a malformed iSCSI header was received), so a RST was sent. |

It should be noted that the "0x" in the above codes indicates by convention that the values are hexadecimal values. Unused values generally would be considered to be invalid codes.

It also should be noted that the present invention is not limited to this assignment of codes and/or to 16-bit values. Various embodiments may use different codes and/or different numbers of bits. Generally speaking, the number of bits will depend to some degree on the size of the TCP or IP header field in which the RST reason code is carried.

Conveying the RST reason code in the TCP or IP header may be particularly useful for implementations in which the headers of received packets are processed separately from the TCP packet payload, such as where the receiving device has special logic (e.g., dedicated hardware or specialized hardware/software) that processes the header information separately from the TCP payload, for example, as described in U.S. Pat. No. 6,826,615 entitled APPARATUS AND METHOD FOR HARDWARE IMPLEMENTATION OR ACCELERATION OF OPERATING SYSTEM FUNCTIONS (Barrall et al.), which is hereby incorporated herein by reference in its entirety. By including the RST reason code in the header rather than in the TCP payload, such dedicated logic can be configured to access the RST reason code directly from the header. Similarly, dedicated hardware or specialized hardware/software that formats TCP and/or IP headers can be adapted to insert the RST reason code in the appropriate header.

Also, conveying the RST reason code in the TCP or IP header may be particularly useful in situations where two machines interoperate without human intervention. As but one example, conveying the RST reason code in the TCP or IP header may be used in data storage applications when data is transferred from one machine to another machine (e.g., between file servers), e.g., for back-up/archiving, remote mirroring, or other data storage operations.

Figure 2:
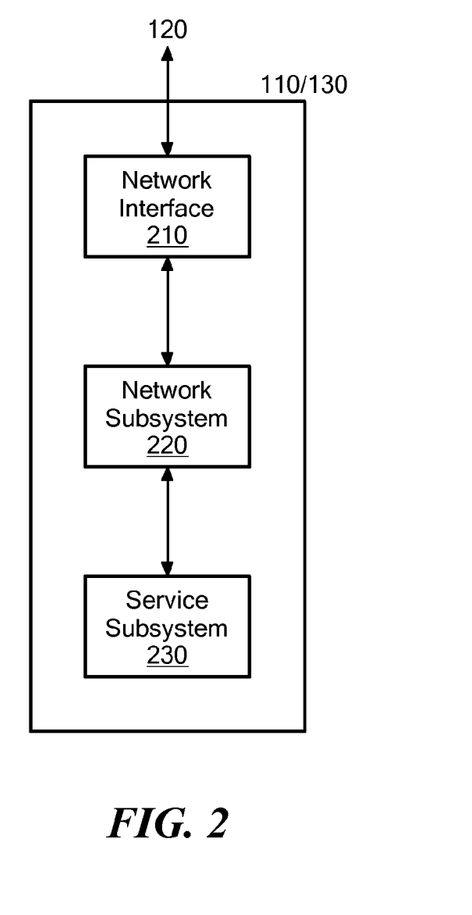
FIG. 2 schematically shows relevant components of a TCP device, in accordance with an exemplary embodiment of the present invention.

FIG. 2 schematically shows relevant components of a TCP device 110/130, in accordance with an exemplary embodiment of the present invention. Among other things, the TCP device includes a network interface 210, a network subsystem 220, and a service subsystem 130. Incoming communication messages from the network 120 are received by the network interface 210 and processed by the network subsystem 220, which validates the message (e.g., confirms that it is a properly formed message, has a correct checksum, and is intended for the communication device, e.g., based on address information at various protocol layers). The network subsystem 220 may de-encapsulate network requests and pass them along to the service subsystem 230 for processing. For example, the network subsystem 220 may perform some or all processing up to the IP layer or up to the TCP layer and pass higher layer messages to the service subsystem 230. Outgoing communication messages are essentially handled in reverse, i.e., the service subsystem 230 typically formats higher layer messages and passes those messages to the network subsystem 220, which in turn encapsulates the higher layer messages in lower layer protocols and transmits them over the network 120 via the network interface 210. Processing of certain protocol layers may be divided between the network subsystem 220 and the service subsystem 230; for example, the network subsystem may handle certain TCP messages in their entirety while passing other TCP messages to the service subsystem 230 for processing.

Figure 3:
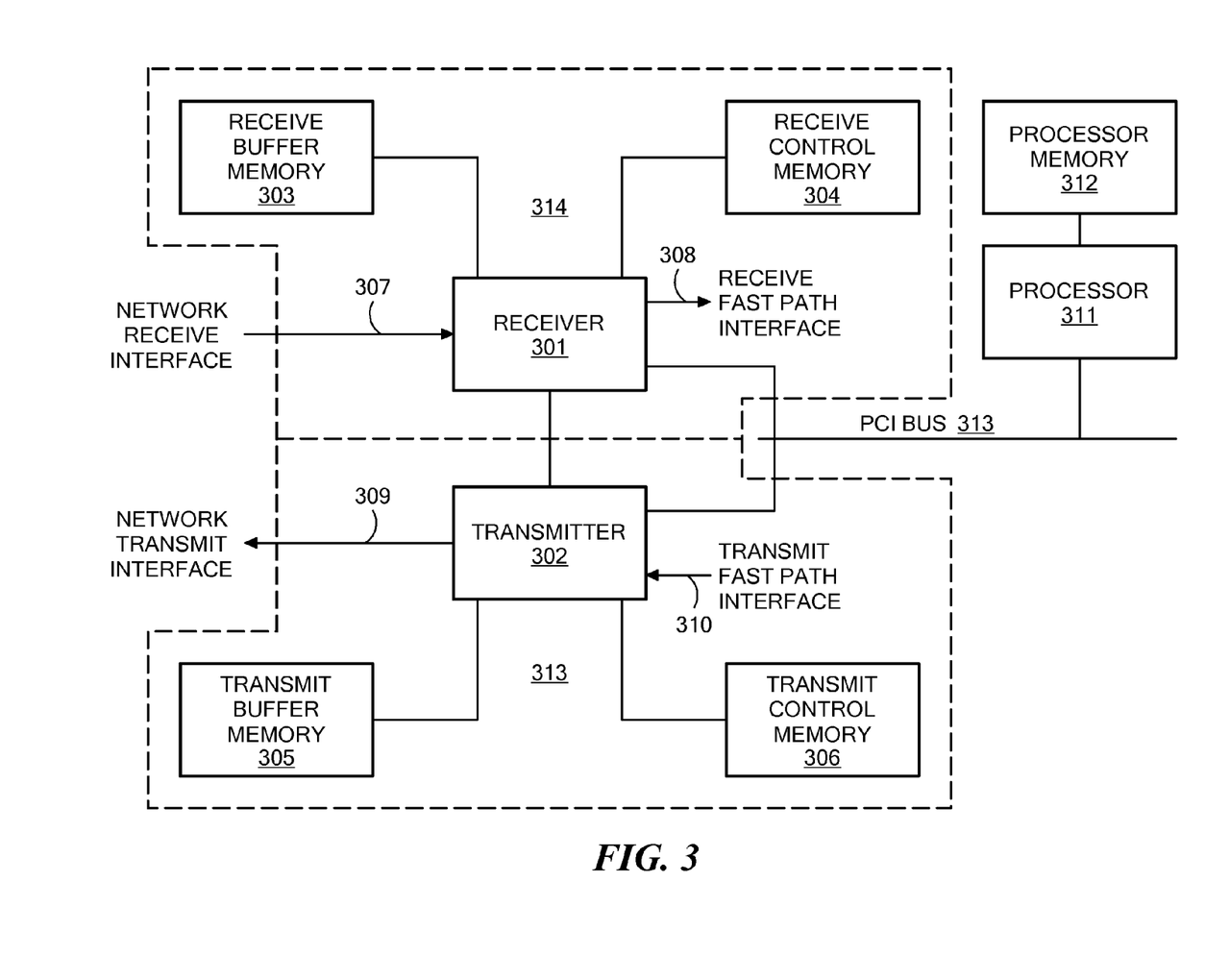
FIG. 3 schematically shows relevant components of a network subsystem, in accordance with an exemplary embodiment of the present invention.

FIG. 3 schematically shows relevant components of a network subsystem 220, in accordance with an exemplary embodiment of the present invention. Among other things, the network subsystem 220 includes a receiver module 314 (which, in this example, includes a receiver 301, receive buffer memory 303, and receive control memory 304) and a transmitter module 313 (which, in this example, includes a transmitter 302, transmit buffer memory 305, and transmit control memory 306). The receiver 301 and the transmitter 302 are coupled to the network subsystem 210 via interfaces 307 and 309, respectively. The receiver 301 and/or the transmitter 301 may be coupled (e.g., via a PCI bus 313) to a processor 311 having an associated processor memory 312 for storage of data and instructions. The processor 311 and processor memory 312 may be part of the network subsystem 220, may be part of the service subsystem 230, or may be separate from both the network subsystem 220 and the service subsystem 230 (e.g., a distinct host processor). Additionally or alternatively, the receiver 301 and transmitter 302 may be coupled to the service subsystem 230 via fast path interfaces 308 and 310, respectively; among other things, such fast path interfaces allow certain information to be passed between the network subsystem 220 and the service subsystem 230 without intervention by the processor 311.

Generally speaking, the receiver 301 receives and processes messages from the network receive interface 307. The receiver 301 may partially or completely process a received message, for example, up to the IP layer or up to the TCP layer, and may pass some or all of a received protocol message to the processor 311 and/or the service subsystem 230 for further processing. For example, using control information contained in the receive control memory 304 and transmit control memory 306 (e.g., TCP connection information), the receiver 301 may process certain TCP segments without processor intervention (e.g., TCP data segments associated with established TCP connections) while passing other TCP segments to the processor 311 for processing (e.g., TCP segments for establishing TCP connections). The receiver 301 may de-encapsulate an upper layer protocol message (e.g., an application layer request encapsulated in a TCP segment) and store de-encapsulated data in the receive buffer memory 303, from where it may be retrieved by the processor 311 via PCI bus 313 or output to the receive fast path interface 308 as determined by the receiver 301.

Generally speaking, the transmitter 302 accepts transmit requests (e.g., upper layer protocol messages) from transmit fast path interface 310 and/or from the processor 311 via PCI bus 313. Data associated with transmit requests may be stored in transmit buffer memory 305. Using control information contained in the transmit control memory 306 (e.g., TCP connection information), the transmitter 302 may format TCP segments including transmit request data. The transmitter 302 may further encapsulate the TCP segments (e.g., in IP datagrams) and transmit the encapsulated TCP segments to the network interface 210 via the network transmit interface 309.

Carrying RST Reason Code in TCP Header

In certain exemplary embodiments, the RST reason code is carried in a field of the TCP header such as the Urgent Pointer field. Among other things, conveying the RST reason code in the TCP header provides ready access to the RST reason code (e.g., for hardware that handles the TCP and lower layer headers) while also allowing a RST reason code to be carried regardless of the protocol over which TCP runs (e.g., IP, Ethernet, etc.).

The Urgent Pointer field is a 16-bit field that typically is only interpreted by the receiving TCP device when a specific control bit (i.e., the "URG" control bit) is set. Thus, when a RST reason code is conveyed in the Urgent Pointer field by an enhanced TCP device, the enhanced TCP device typically ensures that the "URG" control bit is not set. In this way, enhanced TCP devices that support the RST reason code can transmit and receive RST reason codes via the Urgent Pointer field, while a standard TCP device that receives a RST packet from an enhanced TCP device will ignore the RST reason code in the Urgent Pointer field because the "URG" bit is not set. Furthermore, the values for the RST reason codes are typically selected so that default values that may be transmitted by standard TCP devices in the Urgent Pointer field (e.g., all zeros or all ones) will not be mistaken for valid RST reason codes.

Figure 4:
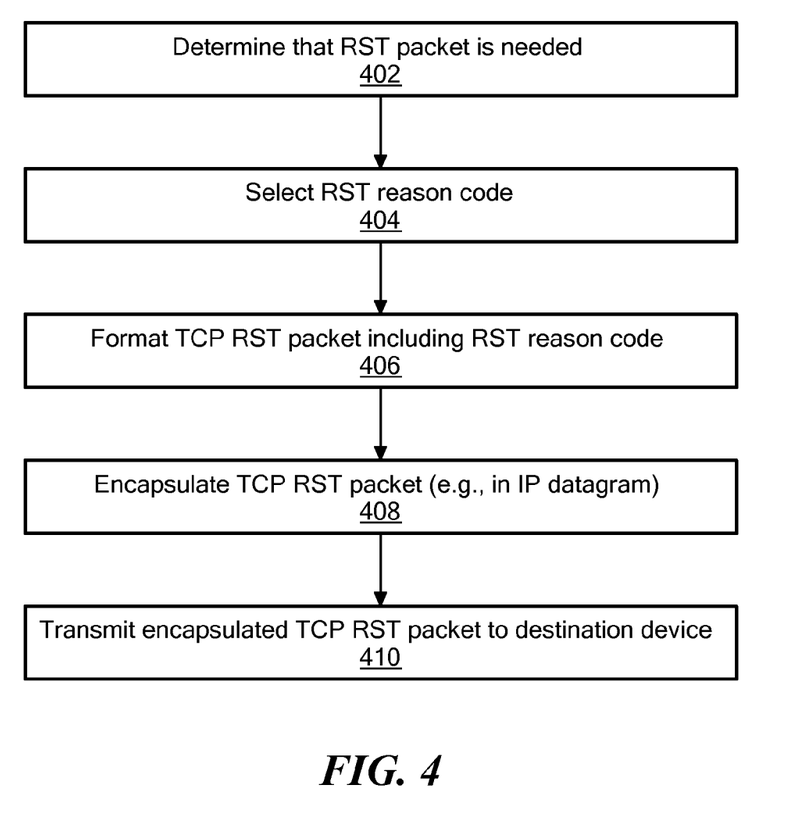
FIG. 4 is a logic flow diagram for conveying the RST reason code in the TCP header, in accordance with an exemplary embodiment of the present invention.

FIG. 4 is a logic flow diagram for conveying the RST reason code in the TCP header, in accordance with an exemplary embodiment of the present invention. In various embodiments of the present invention, some or all of this logic may be performed by the transmitter 302, by the processor 311 running specifically programmed software, and/or by the service subsystem 230. In block 402, a determination is made that a TCP RST packet is needed. In block 404, the appropriate RST reason code is selected for the TCP RST packet. In block 406, a TCP RST packet is formatted including the RST reason code in the TCP header. In block 408, the TCP RST packet is encapsulated, e.g., in an IP datagram. In block 410, the encapsulated TCP RST packet is transmitted to the destination device.

As discussed above with reference to FIG. 3, in certain embodiments, the transmitter 302 may format TCP segments using control information contained in the transmit control memory 306. Such formatting of TCP segments may be performed by the transmitter 302 exclusively in hardware. The transmitter 302 may be instructed to transmit a TCP RST packet, e.g., in the form of a transmit request from the transmit fast path interface 310 and/or from the processor 311; such transmit requests may include the RST reason code or may include an indicator that allows the transmitter 302 to generate the appropriate RST reason code (e.g., using a lookup table or other mapping of indicator to RST reason code). Additionally or alternatively, as part of its own TCP processing, the transmitter 302 may determine that a TCP RST packet is needed, in which case the transmitter 302 may provide the appropriate RST reason code for the TCP RST packet (e.g., the RST reason code may be hard-coded in the transmitter 302 logic). In other embodiments, a TCP RST packet including an RST reason code may be formatted by the processor 311 or by the service subsystem 230 and passed to the transmitter 302. Thus, in various alternative embodiments, formatting of TCP RST packets including RST reason codes may be performed exclusively in hardware, exclusively in software, or using both hardware and software.

Figure 5:
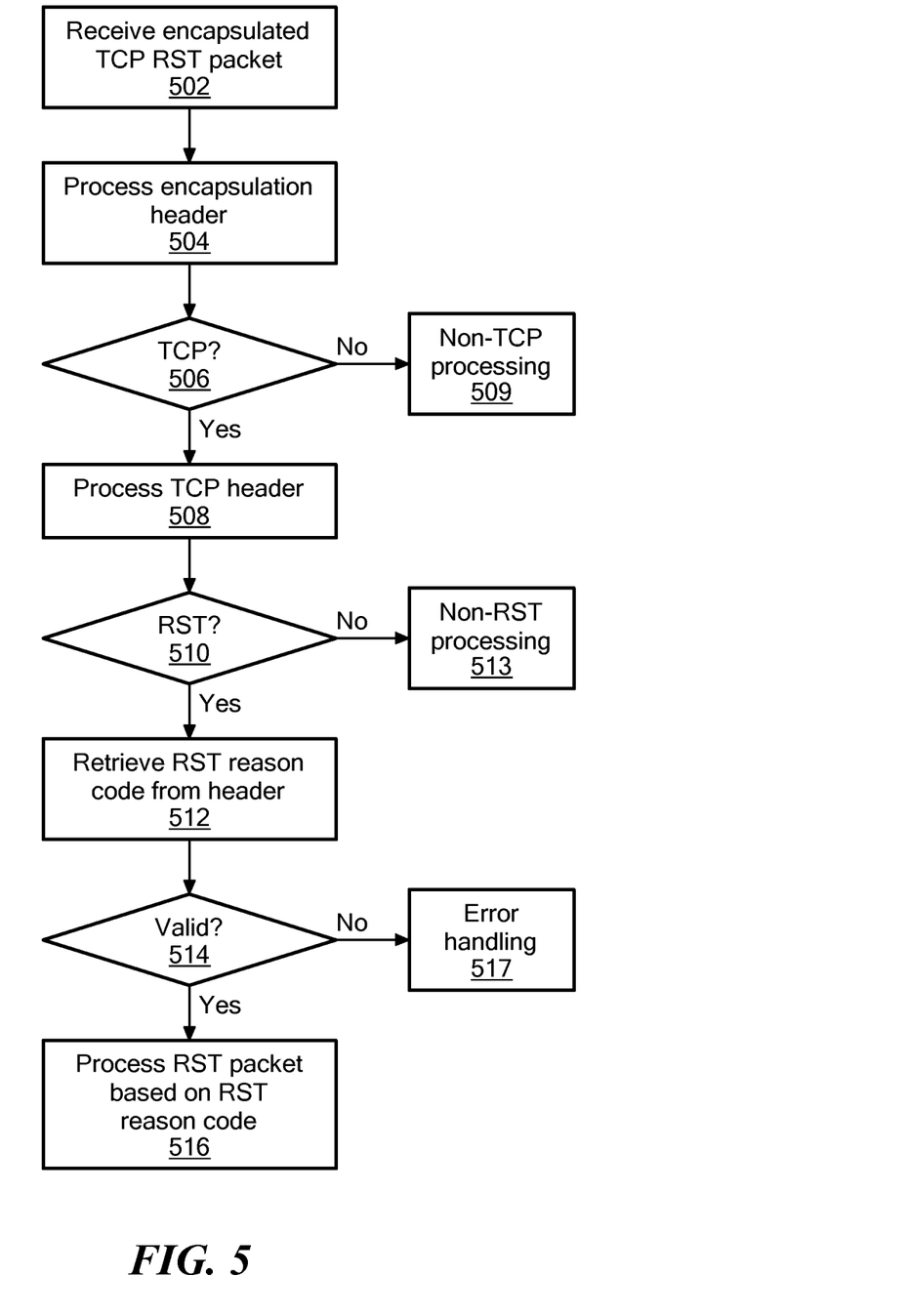
FIG. 5 is a logic flow diagram for processing a TCP RST packet based on the RST reason code carried in the TCP header, in accordance with an exemplary embodiment of the present invention.

FIG. 5 is a logic flow diagram for processing a TCP RST packet based on the RST reason code carried in the TCP header, in accordance with an exemplary embodiment of the present invention. In various embodiments of the present invention, some or all of this logic may be performed by the receiver 301, by the processor 311 running specifically programmed software, and/or by the service subsystem 230. In block 502, an encapsulated TCP RST packet is received. In block 504, the encapsulation header (e.g., IP header) is processed, e.g., to validate the message and determine whether the encapsulated information includes a TCP segment. If the encapsulated information does not include a TCP segment (NO in block 506), then non-TCP processing occurs in block 509. If, however, the encapsulated information includes a TCP segment (YES in block 506), then the TCP header is processed in block 508, e.g., to validate the TCP segment and determine whether the TCP segment is a RST. If the TCP segment is not a RST (NO in block 510), then non-RST processing occurs in block 513. If, however, the TCP segment is a RST (YES in block 510), then the RST reason code is retrieved from the header, in block 512. If the RST reason code is determined to be a valid RST reason code (YES in block 514), then the RST packets is processed based on the RST reason code, in block 516. If, however, the RST reason code is invalid (NO in block 514), then error handling occurs in block 517, which may include rejecting the RST packet or performing a generic reset.

As discussed above with reference to FIG. 3, the receiver 301 may partially or completely process a received message, for example, up to the IP layer or up to the TCP layer, and may pass some or all of a received protocol message to the processor 311 and/or the service subsystem 230 for further processing. Such processing may be performed by the receiver 301 exclusively in hardware.

Figure 6:
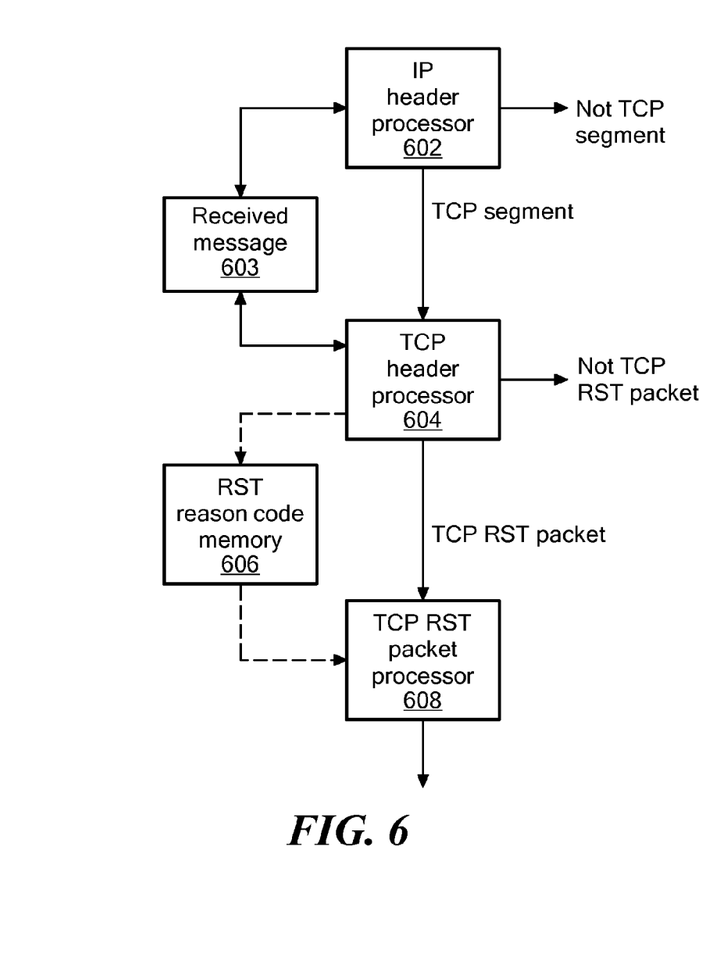
FIG. 6 schematically shows relevant receiver hardware logic blocks for processing TCP RST packets based on a RST reason code carried in the TCP header, in accordance with an exemplary embodiment of the present invention.

FIG. 6 schematically shows relevant receiver 301 hardware logic blocks for processing TCP RST packets based on a RST reason code carried in the TCP header, in accordance with an exemplary embodiment of the present invention. Among other things, the receiver 301 here includes an IP header processor 602, a TCP header processor 604, and a TCP RST packet processor 608. Generally speaking, the IP header processor 602 processes the IP layer of the received message 603, e.g., to validate the message, determine whether the IP datagram is destined for the device (e.g., based on the destination IP address of the IP datagram), and determine whether IP datagram includes a TCP segment. TCP segments are processed at least initially by the TCP header processor, which, among other things, determines whether the TCP segment is a TCP RST packet, and if it is, optionally retrieves the RST reason code from the TCP header of the received message 603 and stores the RST reason code, e.g., in a RST reason code memory 606 (which may be, for example, a hardware register or a location in the receive control block for the packet stored in the receive control memory 304). The TCP RST packet then may be processed further by a TCP RST packet processor 608 based on the RST reason code (which may be obtained from a RST reason code memory 606 or may be retrieved from the received message 603). The TCP RST packet processor 608 may perform some or all of the reset processing or may forward the TCP RSP packet to the processor 311 or receive fast path interface 308 for further processing.

It should be noted that retrieving the RST reason code from the TCP header generally involves retrieving the RST reason code from a predetermined offset into the received message 603 and thus can be readily implemented in hardware. Furthermore, the TCP reset packet may be processed differently based on the RST reason code, e.g., by selecting a specific processor or software module based on the RST reason code.

Carrying RST Reason Code in IP Header

In certain exemplary embodiments, the RST reason code is carried in a field of the IP header such as the Identification field of the IPv4 header or the Flow Label field of the IPv6 header. Among other things, conveying the RST reason code in the IP header provides ready access to the RST reason code (e.g., for hardware that handles the TCP and IP headers) while also allowing a RST reason code to be carried for protocols other than TCP running above the IP layer.

The Identification field is a 16-bit field that is designated for aiding assembly of datagram fragments and is only interpreted by the receiving TCP device when fragmentation is indicated (e.g., using various control flags). Thus, when a RST reason code is conveyed in the Identification field by an enhanced TCP device, the enhanced TCP device ensures that fragmentation is not indicated. In this way, enhanced TCP devices that support the RST reason code can transmit and receive RST reason codes via the Identification field, while a standard TCP device that receives a RST packet from an enhanced TCP device will ignore the RST reason code in the Identification field because fragmentation is not indicated. Furthermore, the values for the RST reason codes are typically selected so that default values that may be transmitted by standard TCP devices in the Identification field (e.g., all zeros or all ones) will not be mistaken for valid RST reason codes.

The Flow Label field is a 20-bit field that is designated for labeling sequences of packets for special handling. According to RFC 2460, hosts or routers that do not support the functions of the Flow Label field are required to set the field to zero when originating a packet, pass the field on unchanged when forwarding a packet, and ignore the field when receiving a packet. Thus, it is expected that in many networks, the Flow Label field can be safely used to convey the RST reason code between peer enhanced TCP devices, and the default value of zero inserted by a standard TCP device should not be mistaken for a valid RST reason code by a receiving TCP device. In some networks, however, intermediate devices between peer enhanced TCP devices may pay attention to the Flow Label field such that different RST reason codes may be treated as different flows. According to RFC 2460, all packets belonging to the same flow must be sent with the same source address, destination address, and flow label, and flow label values are preferably chosen randomly (or pseudo-randomly) and uniformly from the range 1 to 0xFFFFF so that the Flow Label field can be used as a hash key. In order to address this requirement, the Flow Label field may be subdivided (encoded) into a RST reason code sub-field and a flow sub-field, with some number of bits (e.g., the lower 4 bits) used as the RST reason code and the remaining bits (e.g., the upper 16 bits) used to generate a unique value for a particular source/destination address pairing. In this way, each RST reason code essentially would be viewed as a separate flow for a given source/destination address pairing by any device that pays attention to the Flow Label field.

Figure 7:
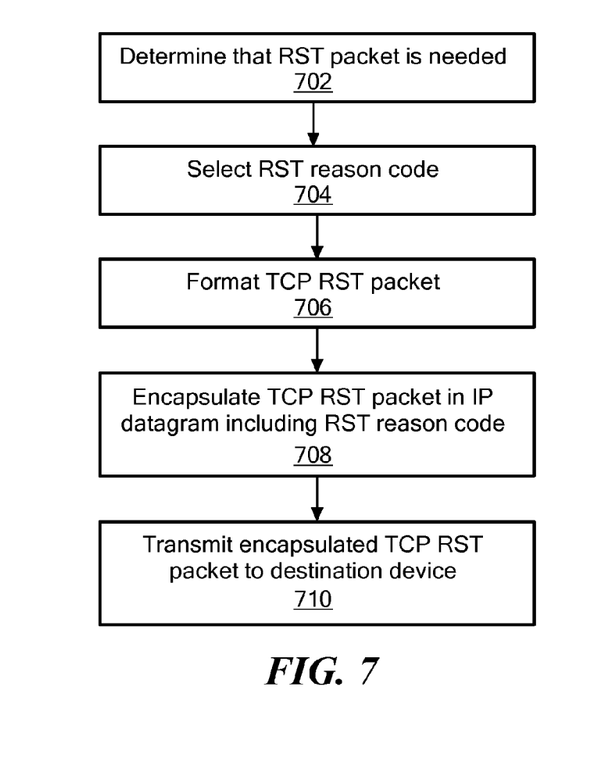
FIG. 7 is a logic flow diagram for conveying the RST reason code in the IP header, in accordance with an exemplary embodiment of the present invention.

FIG. 7 is a logic flow diagram for conveying the RST reason code in the IP header, in accordance with an exemplary embodiment of the present invention. In various embodiments of the present invention, some or all of this logic may be performed by the transmitter 302, by the processor 311 running specifically programmed software, and/or by the service subsystem 230. In block 702, a determination is made that a RST packet is needed. In block 704, the appropriate RST reason code is selected. In block 706, a TCP RST packet is formatted. In block 708, the TCP RST packet is encapsulated in an IP datagram including the RST reason code. In block 710, the encapsulated TCP RST packet is transmitted to the destination device.

As discussed above with reference to FIG. 3, in certain embodiments, the transmitter 302 may format TCP segments using control information contained in the transmit control memory 306. Such formatting of TCP segments may be performed by the transmitter 302 exclusively in hardware. The transmitter 302 may be instructed to transmit a TCP RST packet, e.g., in the form of a transmit request from the transmit fast path interface 310 and/or from the processor 311; such transmit requests may include the RST reason code or may include an indicator that allows the transmitter 302 to generate the appropriate RST reason code (e.g., using a lookup table or other mapping of indicator to RST reason code). Additionally or alternatively, as part of its own TCP processing, the transmitter 302 may determine that a TCP RST packet is needed, in which case the transmitter 302 may provide the appropriate RST reason code for the TCP RST packet (e.g., the RST reason code may be hard-coded in the transmitter 302 logic). In other embodiments, a TCP RST packet may be formatted by the processor 311 or by the service subsystem 230 and passed to the transmitter 302. Thus, in various alternative embodiments, formatting of TCP RST packets may be performed exclusively in hardware, exclusively in software, or using both hardware and software. In any case, as also mentioned above with reference to FIG. 3, the transmitter 302 may encapsulate TCP segments, for example, in IP datagrams, and in this respect, the transmitter 302 may be configured to insert the RST reason code into the IP header.

Figure 8:
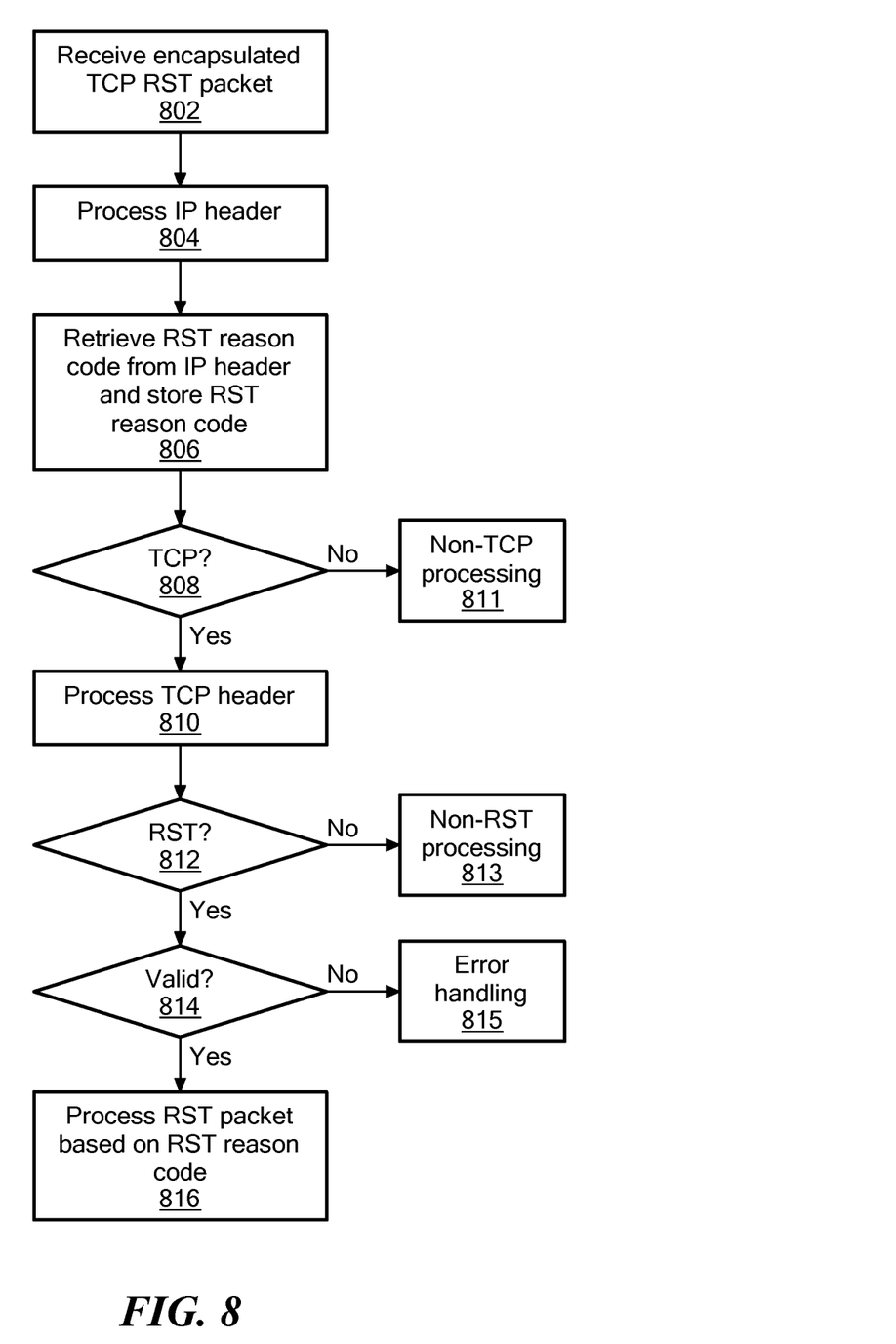
FIG. 8 is a logic flow diagram for one way of processing a TCP RST packet based on the RST reason code carried in the IP header, in accordance with an exemplary embodiment of the present invention.

FIG. 8 is a logic flow diagram for one way of processing a TCP RST packet based on the RST reason code carried in the IP header, in accordance with an exemplary embodiment of the present invention. In various embodiments of the present invention, some or all of this logic may be performed by the receiver 301, by the processor 311 running specifically programmed software, and/or by the service subsystem 230. In block 802, an encapsulated TCP RST packet is received. In block 804, the IP header is processed, e.g., to validate the message and determine whether the encapsulated information includes a TCP segment. In this example, during processing of the IP header, the RST reason code is retrieved from the IP header and stored (e.g., in receive control memory 304), in block 806. If the encapsulated information does not include a TCP segment (NO in block 808), then non-TCP processing occurs in block 811. If, however, the encapsulated information includes a TCP segment (YES in block 808), then the TCP header is processed in block 810, e.g., to validate the TCP segment and determine whether the TCP segment is a RST. If the TCP segment is not a RST (NO in block 812), then non-RST processing occurs in block 813. If, however, the TCP segment is a RST (YES in block 812), then the RST reason code is examined to determine if it is a valid RST reason code, in block 814. If the RST reason code is determined to be a valid RST reason code (YES in block 814), then the RST packet is processed based on the RST reason code, in block 816. If, however, the RST reason code is invalid (NO in block 814), then error handling occurs in block 815, which may include rejecting the RST packet or performing a generic reset.

Figure 9:
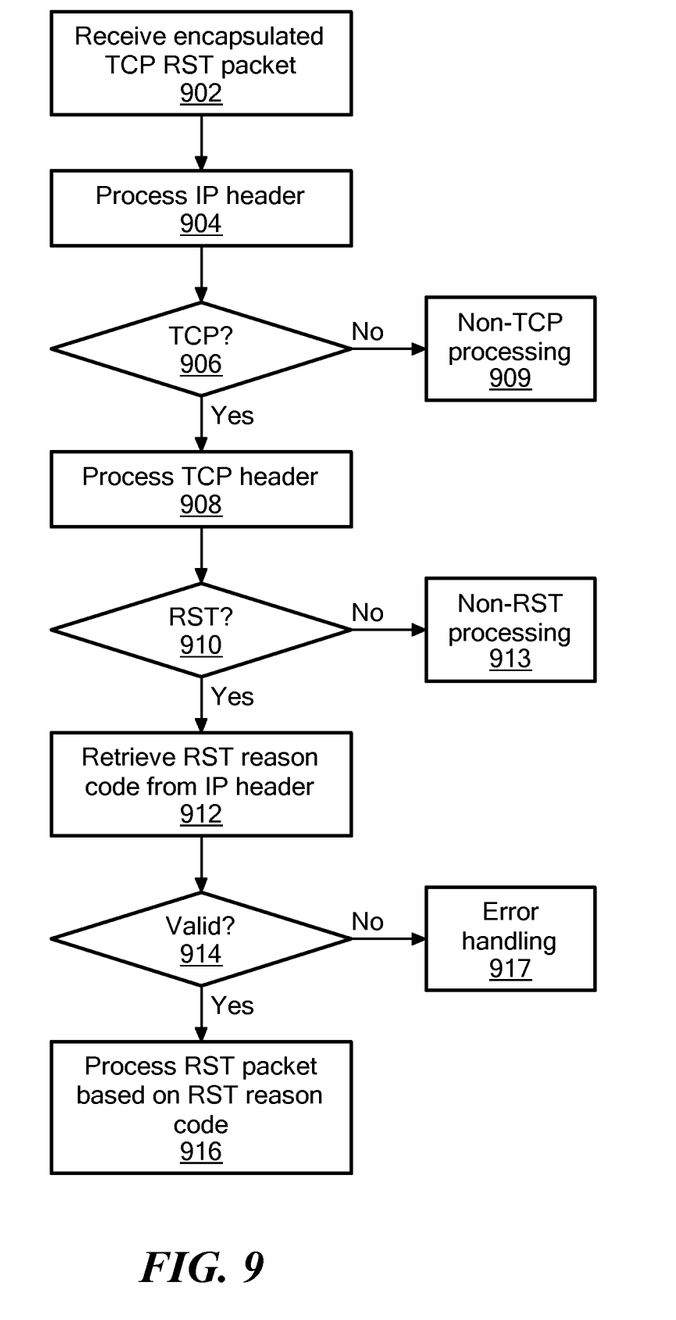
FIG. 9 is a logic flow diagram for another way of processing a TCP RST packet based on the RST reason code carried in the IP header, in accordance with an exemplary embodiment of the present invention.

FIG. 9 is a logic flow diagram for another way of processing a TCP RST packet based on the RST reason code carried in the IP header, in accordance with an exemplary embodiment of the present invention. In various embodiments of the present invention, some or all of this logic may be performed by the receiver 301, by the processor 311 running specifically programmed software, and/or by the service subsystem 230. In block 902, an encapsulated TCP RST packet is received. In block 904, the IP header is processed, e.g., to validate the message and determine whether the encapsulated information includes a TCP segment. If the encapsulated information does not include a TCP segment (NO in block 906), then non-TCP processing occurs in block 909. If, however, the encapsulated information includes a TCP segment (YES in block 906), then the TCP header is processed in block 908, e.g., to validate the TCP segment and determine whether the TCP segment is a RST. If the TCP segment is not a RST (NO in block 910), then non-RST processing occurs in block 913. If, however, the TCP segment is a RST (YES in block 910), then the RST reason code is retrieved from the IP header, in block 912, and is examined to determine if it is a valid RST reason code, in block 914. If the RST reason code is determined to be a valid RST reason code (YES in block 914), then the RST packet is processed based on the RST reason code, in block 916. If, however, the RST reason code is invalid (NO in block 914), then error handling occurs in block 917, which may include rejecting the RST packet or performing a generic reset.

As discussed above with reference to FIG. 3, the receiver 301 may partially or completely process a received message, for example, up to the IP layer or up to the TCP layer, and may pass some or all of a received protocol message to the processor 311 and/or the service subsystem 230 for further processing. Such processing may be performed by the receiver 301 exclusively in hardware.

Figure 10:
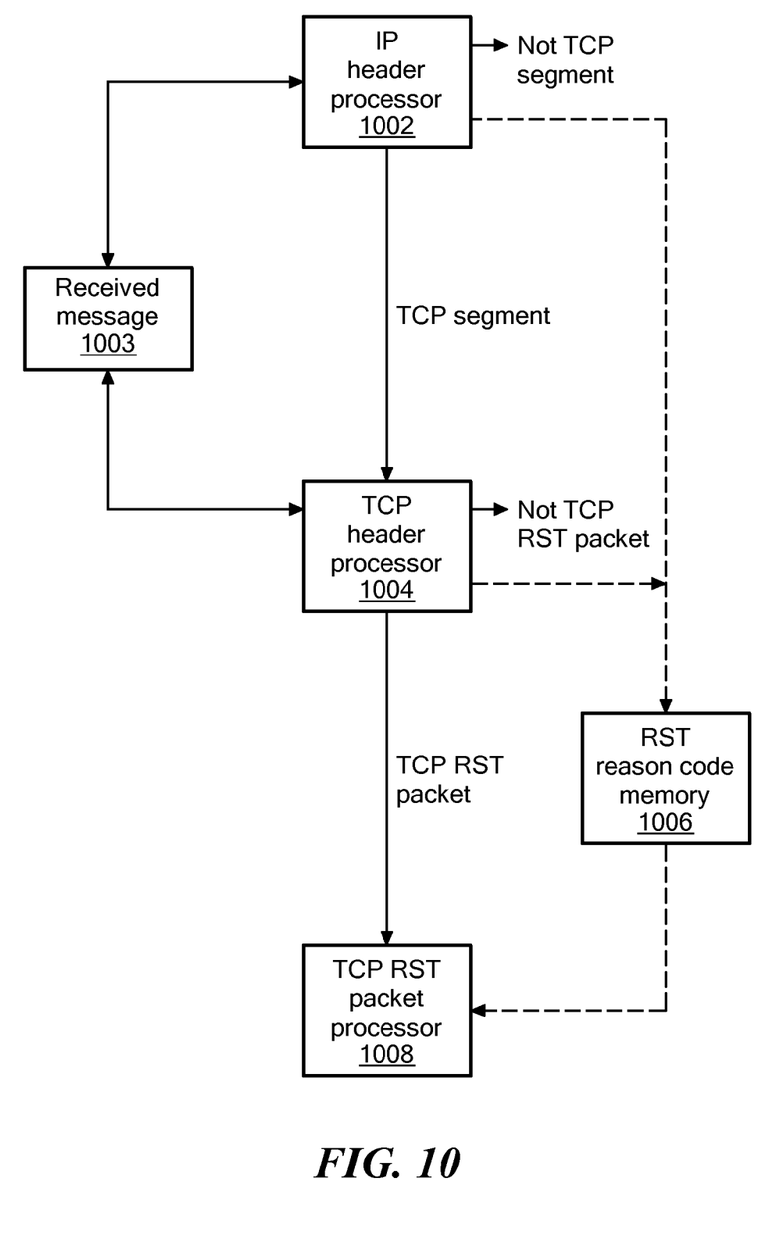
FIG. 10 schematically shows relevant receiver hardware logic blocks for processing TCP RST packets based on a RST reason code carried in the IP header, in accordance with an exemplary embodiment of the present invention.

FIG. 10 schematically shows relevant receiver 301 hardware logic blocks for processing TCP RST packets based on a RST reason code carried in the IP header, in accordance with an exemplary embodiment of the present invention. Among other things, the receiver 301 here includes an IP header processor 1002, a TCP header processor 1004, and a TCP RST packet processor 1008. Generally speaking, the IP header processor 1002 processes the IP layer of the received message 1003, e.g., to validate the message, determine whether the IP datagram is destined for the device (e.g., based on the destination IP address of the IP datagram), and determine whether IP datagram includes a TCP segment. If the IP datagram includes a TCP segment, then in certain implementations, the IP header processor 1002 may be configured to retrieve the RST reason code from the IP header of the received message 1003 and store the RST reason code, e.g., in RST reason code memory 1006. In any case, TCP segments are processed at least initially by the TCP header processor 1004, which, among other things, determines whether the TCP segment is a TCP RST packet. If the TCP segment is a TCP RST packet, then in certain implementations, the TCP header processor 1004 may be configured to retrieve the RST reason code from the IP header of the received message 1003 and store the RST reason code, e.g., in RST reason code memory 1006. In any case, the TCP RST packet then may be processed further by a TCP RST packet processor 1008 based on the RST reason code (which may be obtained from a RST reason code memory 1006 or may be retrieved from the received message 1003). The TCP RST packet processor 1008 may perform some or all of the reset processing or may forward the TCP RSP packet to the processor 311 or receive fast path interface 308 for further processing.

It should be noted that retrieving the RST reason code from the IP header generally involves retrieving the RST reason code from a predetermined offset into the received message 1003 and thus can be readily implemented in hardware. Furthermore, the TCP reset packet may be processed differently based on the RST reason code, e.g., by selecting a specific processor or software module based on the RST reason code.

Miscellaneous

The receiver 301 may include dedicated hardware that operates outside the immediate control of a software program (e.g., running on processor 311 or otherwise) and is configured to at least retrieve the RST reason code from the appropriate header field of the message and at least partially process the TCP RST segment based on the RST reason code (which may involve, for example, performing a TCP connection reset or determining whether to forward the TCP RST packet to the processor 311 or service subsystem 230 for further processing). For embodiments in which the message includes an IP header and a TCP header, the dedicated hardware of the receiver may include an IP header processor configured to process the IP header including at least determining that the message includes a TCP segment and a TCP header processor configured to process the TCP header including at least determining that the TCP segment is a TCP RST segment, where the IP header processor and/or the TCP header processor may be configured to retrieve the RST reason code from the header field of the message.

Similarly, the transmitter 302 may include dedicated hardware that operates outside the immediate control of a software program and is configured to at least insert the RST reason code into the header field of the message.

Such a hardware-based receiver and/or transmitter therefore allows the RST reason to be conveyed and processed in machine-readable form without having to format or process the payload field of the TCP message.

It should be noted that headings are used above for convenience and are not to be construed as limiting the present invention in any way.

It should be noted that terms such as "client," "server," "source," and "destination" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The present invention may be embodied in other specific forms without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A method for conveying the reason for TCP reset in machine-readable form, the method comprising:

by a transmitting device, formatting a message including a TCP RST segment and a RST reason code in a header field of the message and transmitting the message over a communication network, the RST reason code indicating a reason for the TCP RST segment; and by a receiving device, receiving the message from the communication network, retrieving the RST reason code from the header field of the message, and processing the TCP RST segment based on the RST reason code, wherein the header field is a field of a TCP header of the TCP RST segment, and wherein the field of the TCP header is an Urgent Pointer field.

2. A method for conveying the reason for TCP reset in machine-readable form, the method comprising:

by a transmitting device, formatting a message including a TCP RST segment and a RST reason code in a header field of the message and transmitting the message over a communication network, the RST reason code indicating a reason for the TCP RST segment; and by a receiving device, receiving the message from the communication network, retrieving the RST reason code from the header field of the message, and processing the TCP RST segment based on the RST reason code, wherein the message includes an IP datagram encapsulating the TCP RST segment, and wherein the header field is a field of an IP header of the IP datagram.

3. A method according to claim 2, wherein IP datagram is an IPv4 datagram, and wherein the field of the IP header is the Identification field of the IPv4 datagram.

4. A method according to claim 2, wherein IP datagram is an IPv6 datagram, and wherein the field of the IP header is the Flow Label field of the IPv6 datagram.

5. A method according to claim 4, where the Flow Label is subdivided into a RST reason code sub-field and a flow sub-field.

6. A method for conveying the reason for TCP reset in machine-readable form, the method comprising:

formatting, by a transmitting device, a message including a TCP RST segment and a RST reason code in a header field of the message, the RST reason code indicating a reason for the TCP RST segment; and transmitting the message by the transmitting device over a communication network, wherein the header field is a field of a TCP header of the TCP RST segment, and wherein the field of the TCP header is an Urgent Pointer field.

7. A method for conveying the reason for TCP reset in machine-readable form, the method comprising:

formatting, by a transmitting device, a message including a TCP RST segment and a RST reason code in a header field of the message, the RST reason code indicating a reason for the TCP RST segment; and transmitting the message by the transmitting device over a communication network, wherein the message includes an IP datagram encapsulating the TCP RST segment, and wherein the header field is a field of an IP header of the IP datagram.

8. A method according to claim 7, wherein IP datagram is an IPv4 datagram, and wherein the field of the IP header is the Identification field of the IPv4 datagram.

9. A method according to claim 7, wherein IP datagram is an IPv6 datagram, and wherein the field of the IP header is the Flow Label field of the IPv6 datagram.

10. A method according to claim 9, where the Flow Label is subdivided into a RST reason code sub-field and a flow sub-field.

11. Apparatus for conveying the reason for TCP reset in machine-readable form, the apparatus comprising:

a transmitter configured to format a message including a TCP RST segment and a RST reason code in a header field of the message, the RST reason code indicating a reason for the TCP RST segment; and a network interface in communication with the transmitter and configured to transmit the message over a communication network, wherein the header field is a field of a TCP header of the TCP RST segment, and wherein the field of the TCP header is an Urgent Pointer field.

12. Apparatus according to claim 11, wherein the transmitter includes dedicated hardware that operates outside the immediate control of a software program, the dedicated hardware configured to at least insert the RST reason code into the header field of the message.

13. Apparatus for conveying the reason for TCP reset in machine-readable form, the apparatus comprising:

a transmitter configured to format a message including a TCP RST segment and a RST reason code in a header field of the message, the RST reason code indicating a reason for the TCP RST segment; and a network interface in communication with the transmitter and configured to transmit the message over a communication network, wherein the message includes an IP datagram encapsulating the TCP RST segment, and wherein the header field is a field of an IP header of the IP datagram.

14. Apparatus according to claim 13, wherein IP datagram is an IPv4 datagram, and wherein the field of the IP header is the Identification field of the IPv4 datagram.

15. Apparatus according to claim 13, wherein IP datagram is an IPv6 datagram, and wherein the field of the IP header is the Flow Label field of the IPv6 datagram.

16. Apparatus according to claim 15, where the Flow Label is subdivided into a RST reason code sub-field and a flow sub-field.

17. Apparatus according to claim 13, wherein the transmitter includes dedicated hardware that operates outside the immediate control of a software program, the dedicated hardware configured to at least insert the RST reason code into the header field of the message.

18. A method for processing TCP RST packets, the method comprising:

receiving, by a receiving device over a communication network, a message including a TCP RST segment and a RST reason code in a header field of the message, the RST reason code indicating a reason for the TCP RST segment;

retrieving the RST reason code from the header field of the message; and processing the TCP RST segment based on the RST reason code, wherein the header field is a field of a TCP header of the TCP RST segment, and wherein the field of the TCP header is an Urgent Pointer field.

19. A method for processing TCP RST packets, the method comprising:

receiving, by a receiving device over a communication network, a message including a TCP RST segment and a RST reason code in a header field of the message, the RST reason code indicating a reason for the TCP RST segment;

retrieving the RST reason code from the header field of the message; and processing the TCP RST segment based on the RST reason code, wherein the message includes an IP datagram encapsulating the TCP RST segment, and wherein the header field is a field of an IP header of the IP datagram.

20. A method according to claim 19, wherein IP datagram is an IPv4 datagram, and wherein the field of the IP header is the Identification field of the IPv4 datagram.

21. A method according to claim 19, wherein IP datagram is an IPv6 datagram, and wherein the field of the IP header is the Flow Label field of the IPv6 datagram.

22. A method according to claim 21, where the Flow Label is subdivided into a RST reason code sub-field and a flow sub-field.

23. Apparatus for processing TCP RST packets, the apparatus comprising:
   a network interface configured to receive a message over a communication network; and
   a receiver configured to process the message, and when the message includes a TCP RST segment and a RST reason code in a header field of the message, the RST reason code indicating a reason for the TCP RST segment, to retrieve the RST reason code from the header field of the message and process the TCP RST segment based on the RST reason code, wherein the header field is a field of a TCP header of the TCP RST segment, and wherein the field of the TCP header is an Urgent Pointer field.

24. Apparatus according to claim 23, wherein IP datagram is an IPv4 datagram, and wherein the field of the IP header is the Identification field of the IPv4 datagram.

25. Apparatus according to claim 23, wherein the receiver includes dedicated hardware that operates outside the immediate control of a software program, the dedicated hardware configured to retrieve the RST reason code from the header field of the message and process the TCP RST segment based on the RST reason code.

26. Apparatus according to claim 25, wherein the message includes an IP header and a TCP header, and wherein the dedicated hardware comprises:
   an IP header processor configured to process the IP header including at least determining that the message includes a TCP segment; and
   a TCP header processor configured to process the TCP header including at least determining that the TCP segment is a TCP RST segment, at least one of the IP header processor and the TCP header processor configured to retrieve the RST reason code from the header field of the message.

27. Apparatus for processing TCP RST packets, the apparatus comprising:
   a network interface configured to receive a message over a communication network; and
   a receiver configured to process the message, and when the message includes a TCP RST segment and a RST reason code in a header field of the message, the RST reason code indicating a reason for the TCP RST segment, to retrieve the RST reason code from the header field of the message and process the TCP RST segment based on the RST reason code, wherein the message includes an IP datagram encapsulating the TCP RST segment, and wherein the header field is a field of an IP header of the IP datagram.

28. Apparatus according to claim 27, wherein IP datagram is an IPv6 datagram, and wherein the field of the IP header is the Flow Label field of the IPv6 datagram.

29. Apparatus according to claim 28, where the Flow Label is subdivided into a RST reason code sub-field and a flow sub-field.

30. Apparatus according to claim 27, wherein the receiver includes dedicated hardware that operates outside the immediate control of a software program, the dedicated hardware configured to retrieve the RST reason code from the header field of the message and process the TCP RST segment based on the RST reason code.

31. Apparatus according to claim 30, wherein the message includes an IP header and a TCP header, and wherein the dedicated hardware comprises:
   an IP header processor configured to process the IP header including at least determining that the message includes a TCP segment; and
   a TCP header processor configured to process the TCP header including at least determining that the TCP segment is a TCP RST segment, at least one of the IP header processor and the TCP header processor configured to retrieve the RST reason code from the header field of the message.

* * * * *